United States Patent Office 3,532,535
Patented Oct. 6, 1970

3,532,535
SUBSTRATE HAVING VINYLIDENE CHLORIDE COPOLYMER COATING ON OPPOSITE SURFACES THEREOF
Merrill Bleyle, Waltham, and Charles T. Mitchell, Jr., North Reading, Mass., assignors to W. R. Grace & Co., Cambridge, Mass., a corporation of Connecticut
No Drawing. Original application July 21, 1965, Ser. No. 473,812. Divided and this application July 10, 1968, Ser. No. 767,865
Int. Cl. B32b 27/08, 27/10; B44d 1/16
U.S. Cl. 117—68                                    2 Claims

ABSTRACT OF THE DISCLOSURE

A substrate to be used for packaging, coated on each surface with a dried layer of vinylidene chloride copolymer latex, one of the layers compounded with 0.5 to 10% by weight based on the weight of the copolymer solids, of a porous, microfine inorganic additive such as colloidal silica to provide increased gas transmissibility to the combination.

---

This application is a division of copending application Ser. No. 473,812 filed July 21, 1965.

Vinylidene chloride copolymer compositions coated on various substrates such as cellulosic paper and polymeric films have received wide acceptance for use as packaging materials because of the nontoxic, odorless, and barrier properties imparted by the vinylidene chloride copolymers to the products. The barrier properties include a substantially high impermeability to oxygen, possibly the greatest degree of impermeability possessed by a polymeric film material, as well as resistance to moisture vapor transmission. Both of these barrier characteristics are greatly sought after in packaging materials, particularly food products. However, the very properties which make them so desirable as food packaging materials also introduce certain disadvantages in some applications.

There are certain food products such as some cereals and some soft drink powders which require a packaging material which possesses some degree of gas permeability to prevent the build-up of undesirable odor or flavor characteristics in the package and at the same time possesses a high degree of the moisture vapor transmission barrier characteristics.

In packaging materials wherein the vinylidene chloride copolymer latex is applied to both sides of the substrate in order to obtain the heat sealing properties of the vinylidene chloride, blistering of the vinylidene chloride latex layer on the second side often occurs during the drying step as a result of moisture trapped in or near the substrate.

By means of the present invention the aforementioned disadvantages are obviated.

The present invention is concerned with a vinylidene chloride copolymer composition which contains 0.5 to 10% of a porous, microfine, inorganic additive based on the weight of the vinylidene chloride copolymer latex solids.

In applications such as the above-mentioned food packages where some degree of gas permeability is desired without appreciable moisture vapor transmission, the substrate employs a single or double coat of the composition of the present invention containing lower levels of additive, e.g., 0.5 to 3%, and preferably 1 to 2% additive. The moisture vapor barrier characteristics of the vinylidene chloride copolymer layer are decreased only slightly while the gas transmission increases progressively as the level of additive is increased.

In applications where the substrate is to be coated on both sides and blistering is to be avoided, the substrate is coated on at least one side with the composition of the present invention wherein the level of additive employed is in excess of 3%, preferably 5%. In a particularly preferred embodiment the novel composition of the present invention is employed on one side of the substrate and, on the opposite side of the substrate, a vinylidene chloride copolymer barrier layer is employed which does not contain the additive of this invention.

As examples of suitable porous, microfine, inorganic additives, mention may be made of colloidal silica, diatomaceous earth, clay, whiting, titanium dioxide, and carbon black. The term "porous" is to be understood to refer to a material which will allow the passage of gas. If the purpose of the coating is to allow the package on which it is employed to "breathe," the additive is preferably sufficiently porous to permit the passage of a molecule the size of oxygen but not a molecule the size of water. Preferably, the additive has a particle size less than 50 microns in diameter. However, larger particle material may be employed if a rough coating and loss of barrier properties can be tolerated in the particular application. The additive must be substantially water insoluble in order to retain its particulate form in the latex composition.

The vinylidene chloride latex employed in the present invention is a polymer composed of at least 70% by weight of vinylidene chloride copolymerized with other monomeric materials to supplement the inherent properties of the vinylidene chloride. As examples of monomers which may be copolymerized with vinylidene chloride, mention may be made of vinyl esters, alkyl vinyl ethers, acrylate and methacrylate esters, carboxylic acids such as acrylic and itaconic acid, and acrylonitrile and methacrylonitrile. Such monomers are generally employed with the vinylidene chloride in amounts of about 5 to 30 weight percent of the total resin.

A particularly preferred polymeric latex used in the present invention has in excess of 88% weight percent vinylidene chloride, and at least 5 to 8 weight percent of an alkyl acrylate comonomer. A preferred latex has an average particle size of about 1200 A., a surface tension of 35 to 45 dynes per centimeter, and a viscosity at 60% total solids of 20 to 80 c.p.s. (Brookfield No. 1 spindle, 25° C. 60 r.p.m.).

The novel additive and the vinylidene chloride copolymer are mixed thoroughly prior to coating by hand stirring or by mechanical mixing.

The following nonlimiting examples set forth in Table 1 illustrate the novel compositions of the present invention. Samples were prepared by applying the vinylidene chloride copolymer latex to a paper base and drying the coating. The total coating weight was 7 pounds per 3000 square feet. The indicated amounts of colloidal silica were added to and mixed with the vinylidene chloride copolymer latex prior to coating the base material. The moisture vapor transmission rate (grams of moisture vapor/100 square inches/24 hours at 90% relative humidity and 100° F.) and oxygen transmission rate (cubic centimeter of oxygen/100 square inches/24 hours at room temperature and 1 atmosphere differential) was measured on the coated materials. The limit of the oxygen transmission cell used to determine oxygen transmission rate is 390 cc.

TABLE 1

| Additive solids on vinylidene chloride copolymer latex solids | No. of vinylidene chloride latex coats totaling 7 lbs./ream | MVTR | Oxygen transmission rate, cc. |
|---|---|---|---|
| 0 (Control) | 1 | 0.18 | 1 |
| 0.5 | 1 | 0.20 | 6 |
| 0.75 | 1 | 0.22 | 36 |
| 1 | 1 | 0.25 | 390 |
| 1 | 2 | 0.25 | 390 |
| 1.5 | 1 | 0.31 | 390 |
| 1.5 | 2 | 0.28 | 390 |
| 2 | 1 | 0.39 | 390 |
| 2 | 2 | 0.27 | 390 |

The heat sealing characteristics of the novel composition of the present invention are tillustrated in Table 2. In the following experiments a vinylidene chloride copolymer latex which did not contain the additive of the present invention and the same vinylidene chloride copolymer latex which contained 5 parts by weight of colloidal silica per 100 parts of vinylidene chloride copolymer solids were employed. The indicated coting of vinylidene chloride copolymer latex without any additive was made to the one side of a series of glassine sheets. A single coating of the vinylidene chloride copolymer composition containing the colloidal silica was then applied to the opposite side of a series of glassine sheets using a No. 4 Meyer Rod. The coatings were dried, and no blistering of the copolymer layers was noted. After the coatings had dried, the samples were tested for MVTR and heat seal. In Table 2 MVTR and coating weight (pounds per 3000 square feet) are recorded.

TABLE 2

| Vinylidene chloride copolymer latex (no additive) | MVTR | Coating weight |
|---|---|---|
| 0/0 Meyer Rod 2 coats | 10.37 | 3.4 |
| 3/3 Meyer Rod 2 coats | 0.36 | 5.2 |
| 4/4 Meyer Rod 2 coats | 0.22 | 11.5 |
| 6/6 Meyer Rod 2 coats | 0.14 | 15.9 |
| 8/8 Meyer Rod 2 coats | 0.13 | 16.1 |
| 0 Meyer Rod 1 coat | 8.05 | 5.2 |
| 3 Meyer Rod 1 coat | 3.33 | 7.8 |
| 4 Meyer Rod 1 coat | 4.01 | 7.8 |
| 6 Meyer Rod 1 coat | 1.95 | 9.6 |
| 8 Meyer Rod 1 coat | 1.19 | 9.8 |

The samples were heat sealed at two temperatures, 275° F. for ¾ of a second at a pressure of 20 pounds per square inch and at 300° F. for ¾ of a second at 20 pounds per square inch. Preferably the higher tempeiature is employed. The seals were made face to face, back to back, and front to back. In all cases the heat seals were sufficient to result in tearing of the fiber substrate when an attempt to separate the sample was made.

The vinylidene chloride copolymer latex utilized in the above examples comprised about 90% vinylidene chloride with minor amounts of comonomers. The latex had the following properties:

Total solids—60
pH—4.0–4.5
Particle size—0.13 micron (average)
Specific gravity—1.320±0.015
Viscosity (Brookfield No. 1 spindle, 60 r.p.m. at 25° C.)—75 cps.

Any suitable means of coating may be utilized in applying the vinylidene chloride copolymer coatings of the present invention. Devices such as air knife coater, horizontal and vertical size presses, trailing blade, transfer roll, reverse roll, roller coater, gravure, bead coat, metering bar, spray coater, and curtain coater. Deposition may be carried out in one or in several passes.

What is claimed is:
1. A packaging material comprising a paper or polymeric film substrate, a vinylidene chloride copolymer latex coating dried on each of the surfaces of the substrate at least one of said coatings consisting essentially of a vinylidene chloride copolymer latex and 0.5 to 10% by weight based on the weight of said copolymer solids of a substantially water-insoluble porous, microfine, inorganic additive.
2. The packaging material of claim 1 wherein the additive is colloidal silica.

References Cited

UNITED STATES PATENTS

| 2,964,423 | 12/1960 | Van Stappen. |
| 3,021,229 | 2/1962 | Morgan. |
| 3,115,420 | 12/1963 | Centa et al. _____ 117—68 |
| 3,231,411 | 1/1966 | Tyler et al. |
| 3,428,483 | 2/1969 | Owens. |

WILLIAM D. MARTIN, Primary Examiner

R. HUSACK, Assistant Examiner

U.S. Cl. X.R.

99—171; 117—76, 122, 135.5, 161; 260—41